Figure 1:
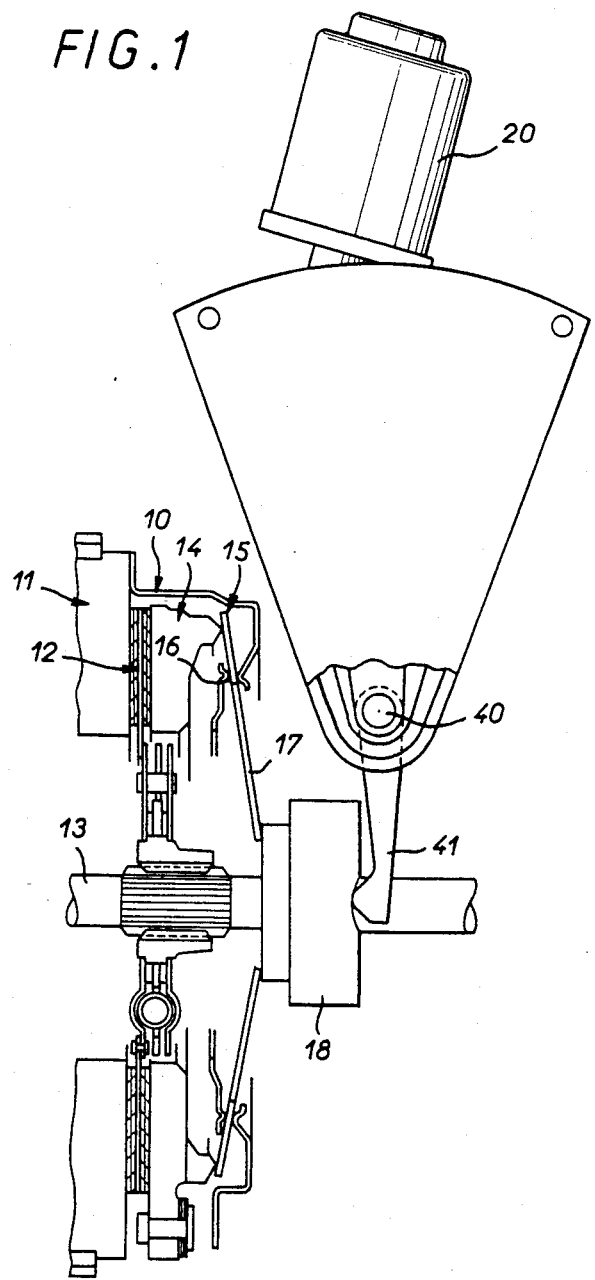

United States Patent [19]

Grunberg et al.

[11] Patent Number: 4,671,400
[45] Date of Patent: Jun. 9, 1987

[54] WEAR TAKE-UP ASSEMBLY FOR THE ACTUATING ARRANGEMENT OF A COUPLING DEVICE SUCH AS A CLUTCH

[75] Inventors: Pierre Grunberg, Paris; Rene-Louis Hamelin, Gif-sur-Yvette; Rabah Arhab, Pierrefitte, all of France

[73] Assignee: Valeo, Paris, France

[21] Appl. No.: 700,896

[22] Filed: Feb. 12, 1985

[30] Foreign Application Priority Data

Feb. 13, 1984 [FR] France ................................ 84 02134
May 28, 1984 [FR] France ................................ 84 08325

[51] Int. Cl.⁴ ........................ F16D 13/75; F16D 23/12
[52] U.S. Cl. .............................. 192/111 A; 192/70.25; 192/84 R; 192/99 S; 74/69
[58] Field of Search .............. 192/111 A, 70.25, 84 R, 192/99 S; 74/69; 188/196 B

[56] References Cited

U.S. PATENT DOCUMENTS

| | | | |
|---|---|---|---|
| 2,632,421 | 3/1953 | Perkins ..................................... | 74/69 |
| 3,376,964 | 4/1968 | Root .................................... | 192/111 |
| 3,430,745 | 3/1969 | Randol ............................. | 192/111 A |
| 3,621,959 | 11/1971 | Gale et al. ........................... | 192/111 |

FOREIGN PATENT DOCUMENTS

| | | |
|---|---|---|
| 2352183 | 4/1975 | Fed. Rep. of Germany . |
| 2844666 | 4/1980 | Fed. Rep. of Germany . |
| 284725 | 5/1980 | Fed. Rep. of Germany . |
| 3046111 | 7/1982 | Fed. Rep. of Germany . |
| 2444972 | 7/1980 | France . |
| 2492923 | 4/1982 | France . |
| 1181920 | 2/1970 | United Kingdom . |
| 1411467 | 10/1975 | United Kingdom . |
| 2019973 | 11/1979 | United Kingdom . |
| 2022210 | 1/1983 | United Kingdom . |
| 2018934 | 2/1983 | United Kingdom . |
| 2037926 | 4/1983 | United Kingdom . |
| 2113792 | 8/1983 | United Kingdom . |
| 2117076 | 10/1983 | United Kingdom . |

OTHER PUBLICATIONS

Rappaport, S., "Kinematics of the Crank and Slot Drive", *Product Engineering*, Jul. 1950, pp. 136-138.

*Primary Examiner*—Rodney H. Bonck
*Assistant Examiner*—David A. Testardi
*Attorney, Agent, or Firm*—Charles E. Brown; Charles A. Brown

[57] ABSTRACT

The wear take-up assembly comprises ratchet engagement device (51) which is interposed between a toothed sector (42) and a lever assembly (19). The toothed sector (42) co-operates with a positioner operating member (20) and resilient force moderator member (21). The lever assembly (19) acts on the clutch by way of the fork (41) and the thrust member (18). The lever assembly (19) advantageously, comprises two levers (49 and 50) so arranged as to amplify the movement of the lever (49) which co-operates with ratchet engagement device (51) so as to permit a fine wear take-up action.

12 Claims, 12 Drawing Figures

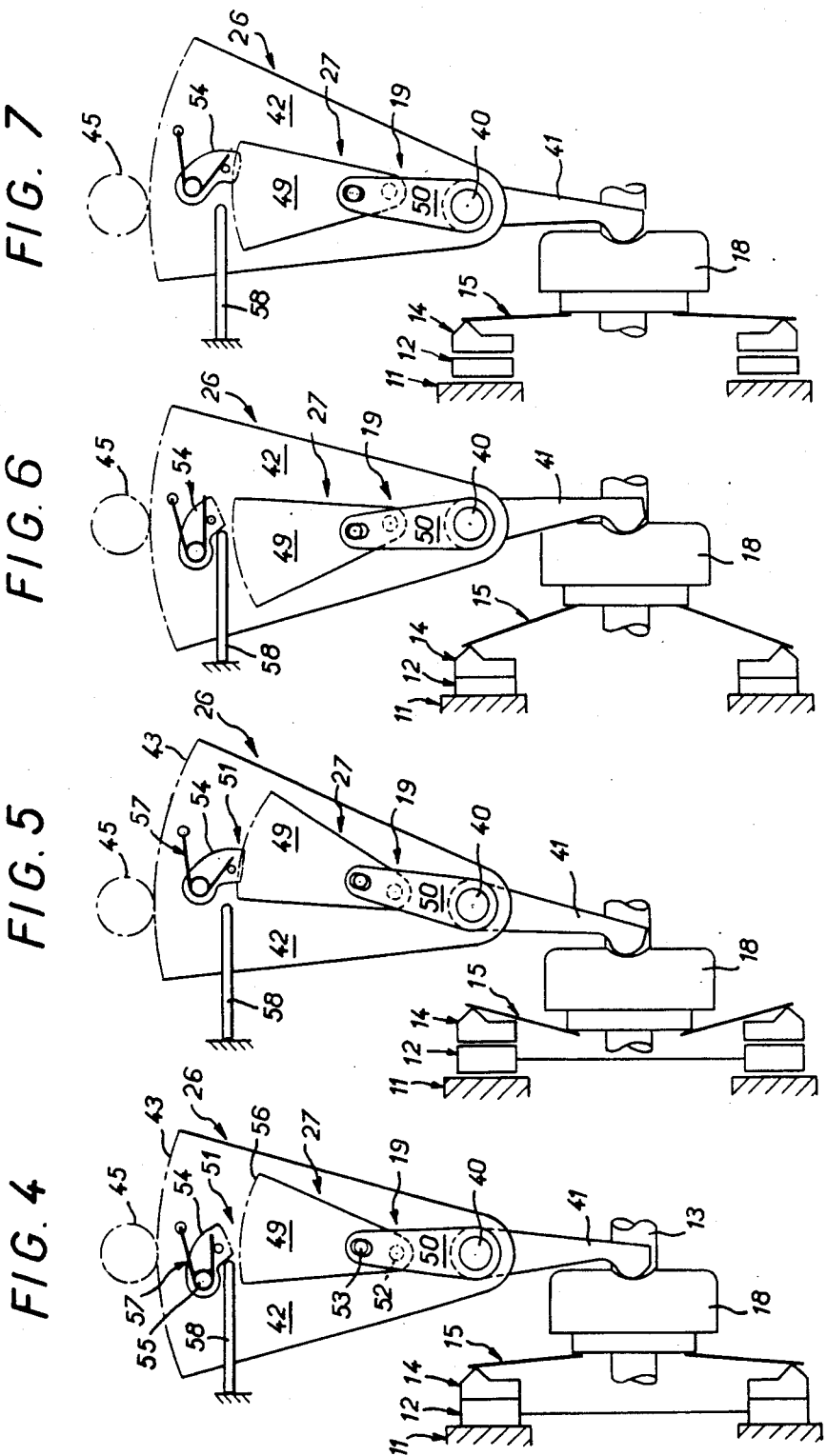

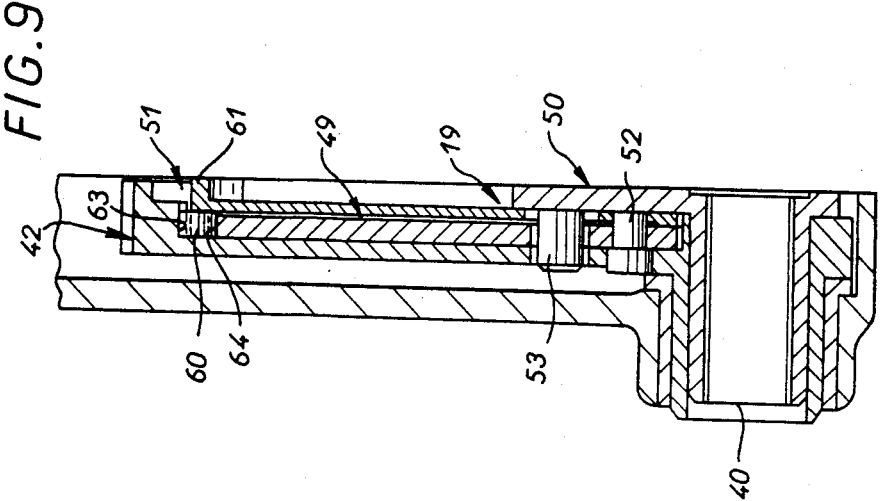
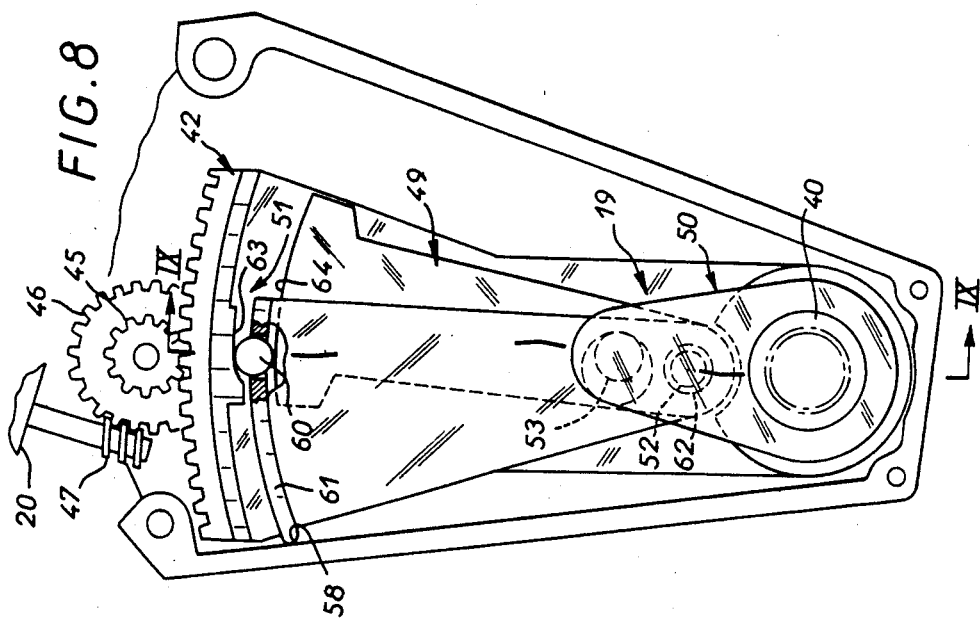

WEAR TAKE-UP ASSEMBLY FOR THE ACTUATING ARRANGEMENT OF A COUPLING DEVICE SUCH AS A CLUTCH

The present invention relates to a wear take-up assembly for the actuating arrangement of a coupling device such as a clutch, wherein a friction disc is adapted to be gripped between a reaction plate and a pressure plate under the force of a spring which is generally in the form of a diaphragm spring. The clutch is in the engaged condition under the resilient force of the diaphragm spring which, by bearing against a cover which is connected to the reaction plate, applies a resilient clamping action to the pressure plate. The clutch is permitted to go from that condition of engagement to a condition of disengagement by the operation of a counteracting actuating mechanism which acts on the movable assembly formed by the pressure plate and the diaphragm spring.

The above-mentioned actuating mechanism generally comprises a thrust member which is movable with a translatory movement, referred to as the clutch release bearing, which acts against a central portion of the diaphragm spring in order thereby, as desired, to put an end to the resilient clamping action of the diaphragm spring against the pressure plate.

Besides the clutch release member, the actuating mechanism comprises a kinematic chain which is generally made up of a fork, levers, link members or rods and the like and which co-operates with positioner operating means, for example an electric motor, and also with resilient means for moderating the operating force. The latter permit the use of reduced power for the operating means.

In general, the actuating mechanism is mounted with a travel movement which extends on respective sides of the truly useful part of the travel movement, the ends of which respectively correspond to a clutch engaged condition and a clutch disengaged condition.

When the clutch disc, which is commonly referred to as the friction disc, wears, inspection and adjustment has to be made on a periodic basis.

The present invention concerns a wear take-up assembly for the actuating arrangement of a coupling device such as a clutch, of the above-indicated type, which permits such periodic inspection and adjustment operations to be eliminated.

According to the invention, the wear take-up assembly is characterised in that it comprises, between on the one hand the positioner operating means and the resilient moderator means, and, on the other hand, the actuating mechanism, connecting means which are provided in two portions, a first portion of which is associated with the positioner operating means and the resilient moderator means, while the second portion is associated with the actuating mechanism, said two portions normally being in ratchet engagement with each other and being disengageable from each other as from a predetermined position in the travel movement of said first portion of the connecting means.

The above-indicated arrangement gives the benefit not only of a low-power motorized actuating arrangement, by virtue of the provision of the resilient moderator means, but also an irreproachable mode of operation, irrespective of the state of wear, with a very simple construction.

In accordance with a preferred embodiment, the wear take-up assembly for the actuating arrangement of a coupling device such as a clutch is of a particularly robust construction, with an excellent service life and a highly precise mode of operation.

The wear take-up assembly is such that said first portion which is associated with the positioner operating means and with the resilient moderator means comprises a toothed sector which is mounted freely rotatably about an actuating shaft of the actuating mechanism and which meshes with pinion means co-operating both with the positioner operating means and with the resilient moderator means while said second portion which is associated with the actuating mechanism comprises lever means which are coupled to said actuating shaft.

By virtue of that arrangement, the overall construction is simple and robust with a minimum travel movement in regard to the toothed sector, and the wear take-up assembly is installed under excellent conditions within the actuating mechanism, while taking up a small amount of space.

In accordance with another feature, said lever means comprise first and second levers, the first lever co-operating by way of the ratchet engagement means with the toothed sector while the second lever is fixed with respect to the actuating shaft, said two levers being connected together by way of two pivot connections, one of which is without play and the other of which is with play, whereby the movement of the first lever is greater than that of the second lever.

As the wear take-up assembly comprising the ratchet engagement means is connected to the first lever whose movement is amplified, the functioning thereof is made particularly precise by permitting a fine wear take-up action with components which are of ample dimensions and which are consequently strong.

In an embodiment, the ratchet engagement means comprise a pawl which is mounted pivotally on the toothed sector and which co-operates with a tooth configuration provided on the lever means.

In an alternative embodiment, the ratchet engagement means comprise a roller which is mounted in a cage mounted rotatably about an axis of rotation and co-operating in a wedging and unwedging mode with bearing surfaces on the toothed sector and the lever means.

In another embodiment, the first portion of the connecting means comprises a toothed rack with which mesh two pinions, one of which is entrained by the positioner operating means while the resilient moderator means are coupled to the other pinion, the second portion of the connecting means being engaged slidably in said rack.

Preferably, a pawl is mounted pivotally on the first portion of the connecting means and co-operates with a tooth configuration provided on the second portion of the connecting means.

In a preferred embodiment, a return spring tends to hold the pawl engaged with the tooth configuration of the second portion of the connecting means while the pawl is capable of co-operating in an abutting condition with a fixed bearing member in order to be disengaged from the tooth configuration and to permit automatic take-up of wear.

Figure 3:
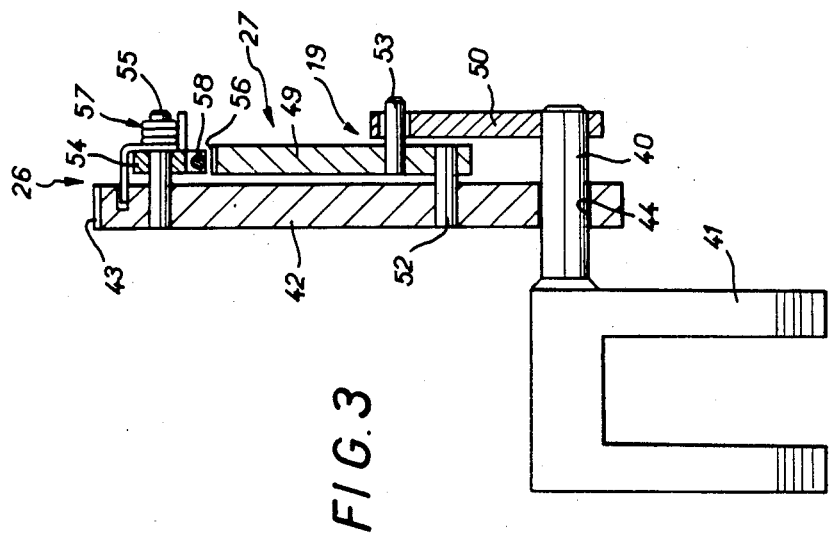
Figure 2:
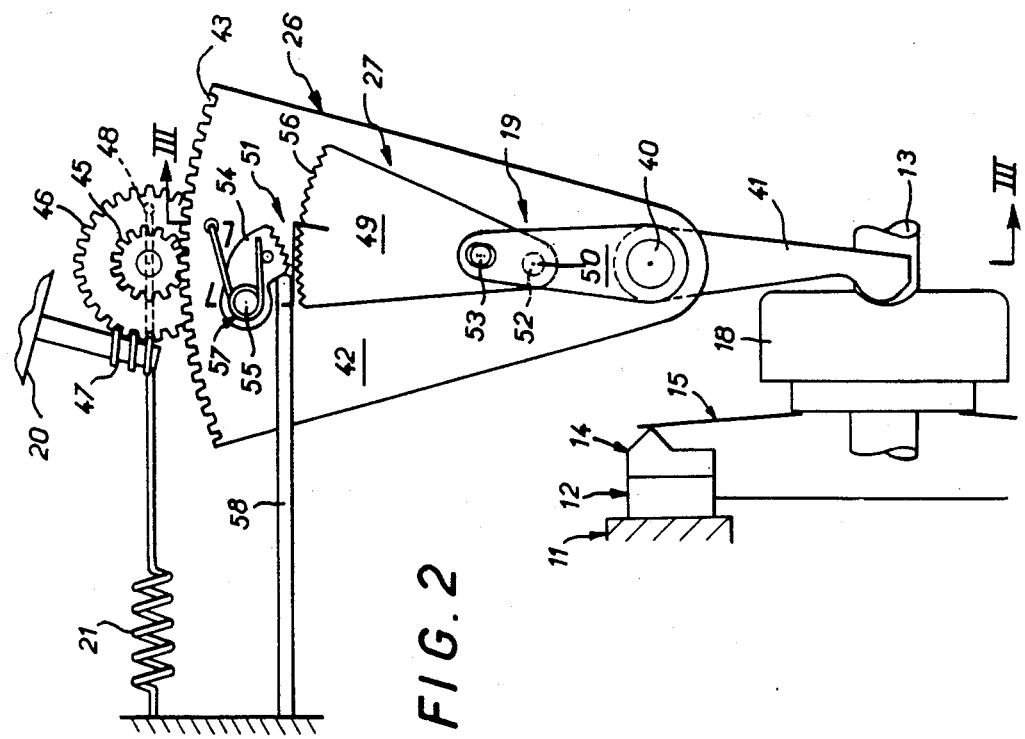
Figure 11:
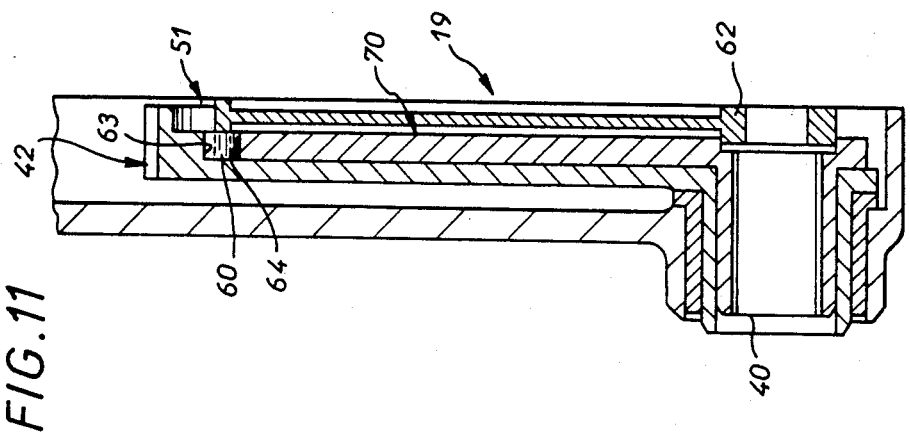
Figure 10:
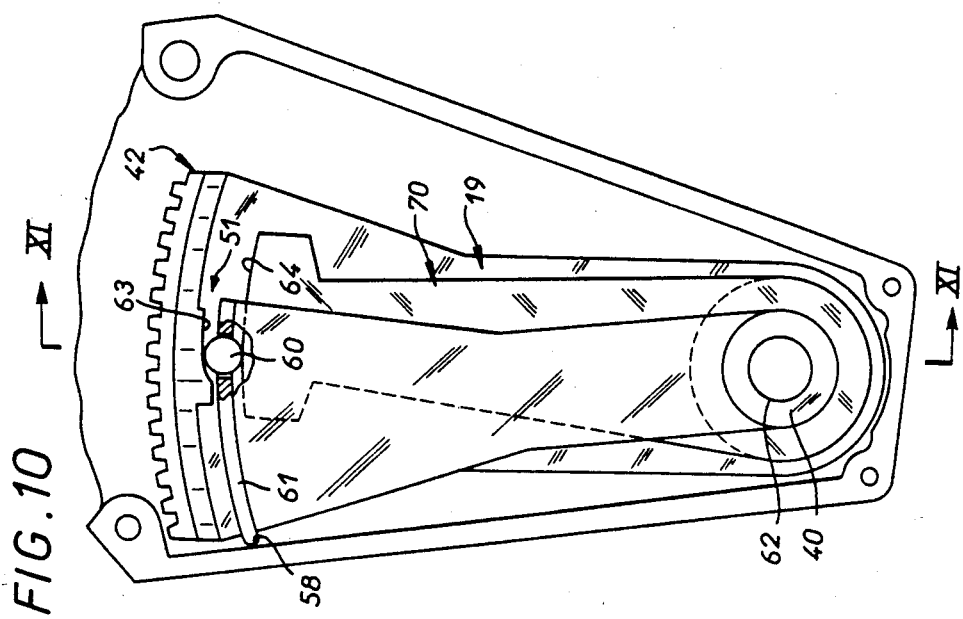
Figure 12:
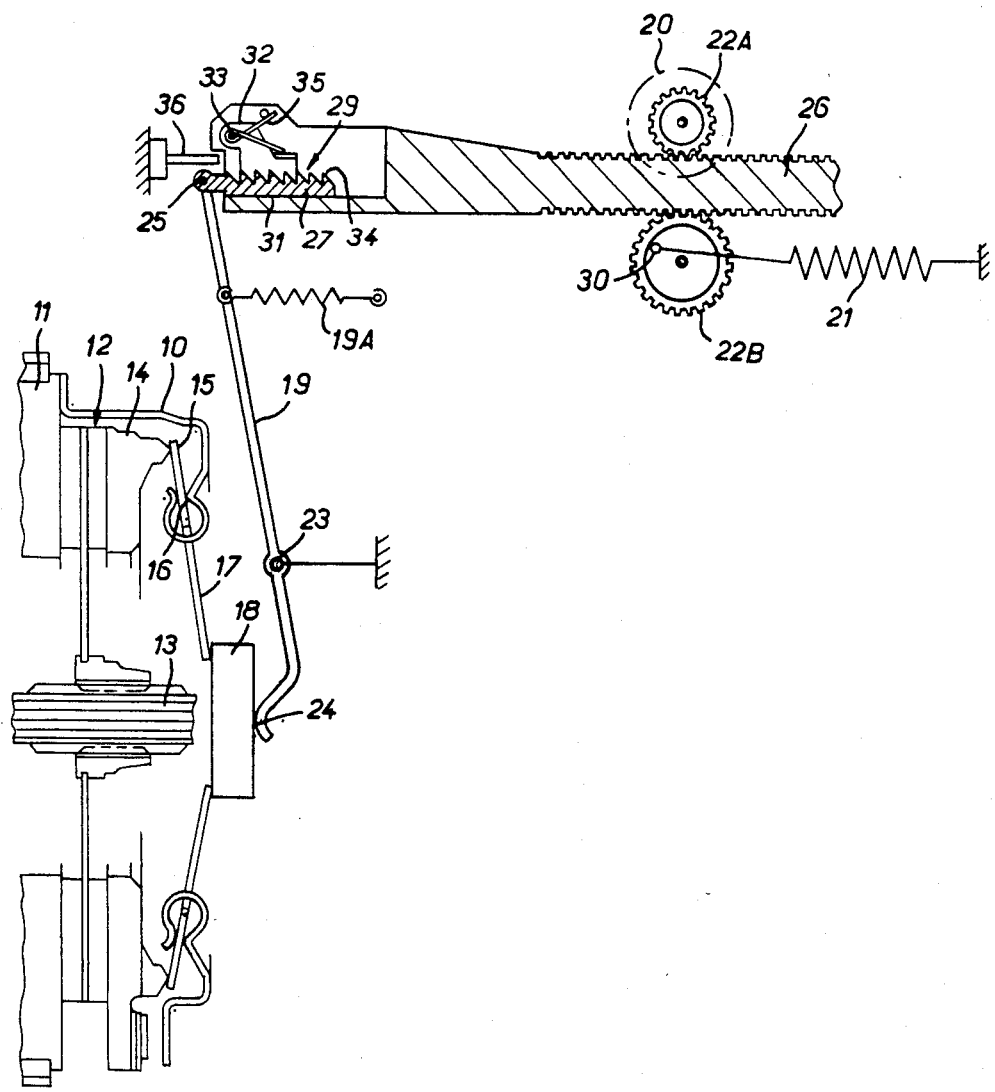

The features and advantages of the invention will be more clearly apparent from the following description which is given by way of example with reference to the accompanying drawings in which:

FIG. 1 is a general diagrammatic view of a clutch and its motorized actuating arrangement, incorporating a wear take-up assembly according to the invention, FIG. 2 is a view in greater detail of the clutch actuating arrangement and the wear take-up assembly, with the clutch in the position of engagement, FIG. 3 is a corresponding view in section taken along broken line III—III in FIG. 2, FIGS. 4, 5, 6 and 7 are diagrammatic views similar to that shown in FIG. 2, in various operating positions and conditions, FIG. 4 showing the clutch in the new condition and in the engaged position, FIG. 5 showing the clutch in the new condition and in the disengaged position, FIG. 6 showing the clutch in the worn condition and in the engaged position and FIG. 7 showing the clutch in the worn condition and in the disengaged position, FIG. 8 is a view similar to that shown in FIG. 2 but relating to an alternative embodiment in which the ratchet engagement means comprise not a pawl but a roller which co-operates with a ramp, FIG. 9 is a corresponding view in section taken along line IX—IX in FIG. 8, FIG. 10 is a view similar to FIG. 8 but showing another embodiment, FIG. 11 is a corresponding view in section taken along line XI—XI in FIG. 10, and FIG. 12 is a diagrammatic view of a clutch actuating arrangement according to the invention, of a linear design.

Reference will first be made to FIGS. 1 to 7 which concern, by way of non-limiting example, application of the invention to the actuation of a diaphragm-type clutch, in particular for a motor vehicle.

Referring to FIG. 1, the clutch comprises a cover 10 which is adapted to be fixed to the flywheel 11 of the engine of the motor vehicle. The flywheel 11 constitutes a reaction plate. The clutch also comprises a clutch or friction disc 12 which is coupled to the primary shaft 13 of the gearbox of the motor vehicle. The friction disc 12 is adapted to be gripped between the reaction plate 11 and a pressure plate 14 which is coupled to the cover 10, under the resilient clamping force of a diaphragm spring 15.

The diaphragm spring 15 bears against the cover 10 at 16 and, in its central region, has fingers 17 which are adapted to be urged towards the left in FIG. 1 by a clutch release member 18 when the clutch is to be actuated from its condition of engagement as shown in FIG. 1 wherein the clutch release member 18 has no effect on the diaphragm spring 15, to a condition of clutch disengagement in which the clutch release member 18, by pushing against the diaphragm spring 15 towards the left in FIG. 1, puts an end to the clamping action applied to the plate 14, thereby freeing the friction disc 12.

Thus, the clutch has its condition modified in dependence on the position of the movable arrangement formed by the pressure plate 14 and the diaphragm spring 15. The arrangement 14 and 15 is movable in both directions along a path of movement which is defined between a first limit position in which the clutch is engaged or "let in", and a second limit position in which the clutch is disengaged or declutched. The diaphragm spring 15 constitutes a resilient return means for returning the arrangement 14 and 15 towards the first limit position.

The clutch release member 18 is part of a counteracting actuating mechanism which is associated with the assembly 14 and 15 and which comprises an actuating shaft 40 which is fixed with respect to a fork 41. The counteracting actuating mechanism is mounted movably along a path of motion which corresponds, position for position, to the path of movement of the assembly 14 and 15 and is thus adapted to act on the assembly 14 and 15 to cause it to move from its first limit position to its second limit position and vice-versa.

Positioner operating means 20 such as a small electric motor are provided in association with the mechanism 40, 41 and 18, the effect of such operating means being to fix any instantaneous position of the mechanism 40, 41 and 18, independently of the resilient return means 15 acting on the assembly 14 and 15.

The positioner operating means 20 are adapted to displace the actuating mechanism 40, 41 and 18 along its path of movement to cause corresponding displacement of the assembly 14 and 15 along its own path of movement. In addition, resilient means 21 for moderating the operating force (see FIG. 2) are also associated with the actuating mechanism. The latter comprises, besides the clutch release member 18, lever means 19 which are associated with the actuating shaft 40.

The lever means 19 are connected to the operating means 20 and to the resilient moderator means 21 by way of connecting means 26 and 27 which are provided in two portions, 26 and 27.

The first portion 26 of the connecting means 26 and 27 is associated with the positioner operating means 20 and with the resilient moderator means 21, while the second portion 27 is associated with the lever 19.

The two portions 26 and 27 co-operate with each other by way of ratchet engagement means 51 which are normally in an engaged position but which are disengageable as from a predetermined position which is close to the position of engagement of the clutch (see FIG. 2), in the path of movement of the first portion 26 of the connecting means 26 and 27, thereby to permit in particular wear of the friction disc 12 to be automatically taken up.

The first portion 26 comprises a sector 42 which is toothed as at 43 and which is mounted freely rotatably at 44 (see FIGS. 2 and 3) about the actuating shaft 40.

The toothed sector 42 engages by means of its tooth configuration 43 with a toothed pinion 45. The pinion 45 is fixed with respect to another toothed pinion 46 which engages with an endless worm 47 driven by the motor 20, the assembly 20, 47, 46 and 45 forming a motor reducing unit. The force moderating spring 21 is coupled to the pinion 46 at 48. Thus, the pinions 45 and 46 form pinion means which co-operate both with the positioner operating means and with the resilient moderator means 21.

The second portion 27 comprises lever means which are coupled to the actuating shaft 40.

As can be seen more particularly from FIGS. 2 and 3, the lever means 19 comprise a first lever 49 and a second lever 50.

The first lever 49 co-operates by ratchet engagement or pawl means 51 with the toothed sector 42. The second lever 50 is fixed with respect to the actuating shaft 40 (see FIGS. 2 and 3).

The two levers 49 and 50 are connected to each other by two pivot connections 52 and 53, one pivot connection 52 being without play while the other connection 53 is with play, in such a manner that the movement of the first lever 49 is greater than that of the second lever 50. As can be seen from FIG. 2, the play at the connection 53 is substantially radial.

In the embodiment shown in FIGS. 2 and 3, the engagement means 51 comprise a pawl 54 which is mounted pivotally at 55 on the toothed sector 42. The pawl 54 co-operates with a tooth configuration at 56 on the lever 49 of the lever means 19. A return spring 57 tends to hold the pawl 54 engaged with the tooth configuration 56 of the lever means 19. The pawl 54 is arranged to co-operate in an abutting manner with a fixed bearing member 58 to be disengaged from the tooth configuration 56 (see FIG. 2) in the clutch engaged position and to permit wear to be automatically taken up.

In operation (FIGS. 1 to 4), when the worm 47 of the electric motor 20 is in a position in which the actuating mechanism is itself in a position which corresponds to the engaged condition of the clutch (see FIG. 4), the counteracting actuating mechanism does not apply any substantial action to the diaphragm spring 15, by way of the fork 41. In such a position, the spring 21 has virtually no effect and the clutch is engaged with a clutch engagement force which is the resilient force of the diaphragm spring 15.

In addition, in such a position, the pawl 54 is slightly raised by the fixed bearing member 58, thereby permitting wear to be taken up. FIG. 4 shows the clutch when the friction disc 12 is in the new, engaged condition while FIG. 6 shows the friction disc 12 when it is worn.

For the purposes of clutch disengagement or release, the electric motor 20 is caused to rotate in the direction corresponding to movement of the arrangement from the position shown in FIG. 4 to the position shown in FIG. 5. The pawl 54 comes away from the fixed bearing member 58 and the mechanism 19, 41 and 18 overcomes the resilient resistance of the diaphragm spring 15 and causes disengagement of the clutch, freeing the friction disc 12 (FIGS. 5 and 7).

FIG. 5 shows the above-indicated clutch disengaged position when the friction disc 12 is new while FIG. 7 shows the clutch disengaged position when the friction disc 12 is worn. In the course of the clutch release operation, the spring 21 acts in accordance with a law which permits a reduced operating force.

For the purposes of reengaging the clutch, operation is in as simple a fashion, but in the opposite direction.

It will be appreciated that the pawl 54 makes it possible to provide for automatic compensation for wear of the friction disc 12. By virtue of the arrangement shown in FIGS. 1 to 7 where the lever means 19 comprise two levers 49 and 50 which are connected together by way of two connections, one 52 of which is without play while the other 53 has radial play, the angular movement of the tooth configuration 56 is greatly amplified with respect to the angular movement of the actuating shaft 40. While providing the benefit of an extremely fine wear take-up action, that makes it possible for the tooth configuration 56 to be made of relatively large dimensions, thereby providing a particularly robust construction and a high degree of operating reliability.

In an alternative embodiment, as shown in FIGS. 8 and 9, the arrangement is similar to that described above with reference to FIGS. 1 to 7, but the ratchet engagement means 51 in this embodiment comprise a roller 60 which is mounted in a cage or guide 61 rotating about an axis of rotation as indicated at 62 and co-operating in a wedging and unwedging mode with bearing surfaces 63 and 64 on the toothed sector 42 and the lever means 19.

The surface 63 of the toothed sector 42 forms a wedging ramp means while the surface 64 of the lever means 19 is cylindrical coaxially with the axis of rotation 62 of the cage 61.

As will be seen from FIG. 8, the cage 61 co-operates with the fixed bearing means 58 for producing the unwedging action.

In the embodiment illustrated in FIGS. 8 and 9, as in FIGS. 1 to 7, the lever means 19 comprise the two levers 49 and 50 which are connected by the connection 52 without play and the connection 53 with play. The play-less connection 52 is coaxial with the axis of rotation 62 of the cage 61. It is the lever 49 which has the cylindrical wedging surface 64 while the lever 50 is fixed with respect to the actuating shaft 40, as in FIGS. 1 to 7.

The mode of operation of this arrangement is similar to that described above with reference to FIGS. 1 to 7. By virtue of the arrangement of the lever means 19, in the form of the two levers 49 and 50, the engagement means 51 comprising the roller 60, the cage 61 and the surfaces 63 and 64 provide the benefit, as described above, of an amplified angular movement and are advantageously of large dimensions which are favourable from the point of view of strength and efficiency.

In another alternative embodiment, as shown in FIGS. 10 and 11, the arrangement is similar to that just described above with reference to FIGS. 8 and 9. The engagement means 51 still comprise the roller 60, the cage 61 and the bearing surfaces 63 and 64 but in this case the lever means 19 comprise a single lever 70 which co-operates by way of the roller 60 with the ramp means 63 of the toothed sector 42 and which is fixed with respect to the actuating shaft 40. In this case, the axis of rotation 62 of the cage 61 is coaxial with the actuating shaft 40.

The mode of operation is still similar to that described above.

If reference is now made to FIG. 12, it will be seen that the clutch release member 18 is part of a counteracting actuating mechanism 18 and 19 associated with the assembly 14 and 15. The actuating mechanism is mounted movably along a path of movement which corresponds, position for position, to that of the assembly 14 and 15.

The mechanism 18 and 19 may be of any suitable nature, in particular mechanical.

The mechanism 18 and 19 is thus adapted to act on the assembly 14 and 15 in order to cause the latter to move from its first limit position to its second limit position and viceversa.

Positioner operating means 20 such as a small electric motor are provided in association with the actuating mechanism 18 and 19 and have the effect of fixing any instantaneous position of the actuating mechanism 18 and 19, independently of the resilient return means 15 of the assembly 14 and 15.

The positioner operating means 20 are adapted to displace the actuating mechanism 18 and 19 along the path of movement thereof to cause corresponding displacement of the assembly 14 and 15 along its own path of movement. In addition, resilient operating force-moderating means 21 are also associated with the actuating mechanism 18 and 19. Besides the clutch release member 18, the latter comprises a lever 19 which is mounted pivotably about a fixed pivot 23 and which is associated with a spring 19A, referred to as the permanent-contact spring.

The lever 19 co-operates with the clutch release member 18 by way of an end portion 24. The other end 25 of the lever 19 is connected to the operating means 20 and to the resilient moderator means 21 by connecting means 26 and 27 which are provided in two portions 26 and 27.

The first portion 26 of the connecting means 26 and 27 is associated with the positioner operating means 20 and with the resilient moderator means 21 while the second portion 27 is associated with the lever 19.

The two portions 26 and 27 are normally in ratchet engagement with each other at 29 and are disengageable from each other, as from a predetermined position on the path of movement of the first portion 26 of the connecting means 26 and 27, thereby to permit wear of the friction disc 12 to be automatically taken up.

More particularly, the first portion 26 of the connecting means 26 and 27 comprises a rack with which engage two pinions of which one, denoted by reference numeral 22A, is driven by positioner means such as the small electric motor 20, while the resilient moderator means 21 are coupled to the other pinion 22B at 30. The second portion 27 of the connecting means 26 and 27 is engaged slidably at 31 in the rack 26.

A pawl 32 is mounted pivotally at 33 on the rack 26 and co-operates at 29 with a tooth configuration 34 provided on the second portion 27 of the connecting means 26 and 27.

A return spring 35 tends to hold the pawl 32 in a position of engagement with the tooth configuration 34 while a fixed bearing member in the form of a finger or projection 36 co-operates with the pawl 32 to disengage it from the tooth configuration as from a predetermined position on the path of movement of the portion 26, in order to permit wear of the friction disc 12 to be automatically taken up.

It will be appreciated that the invention is not limited to the embodiment illustrated but embraces any variations in the construction of the various elements thereof and in the application thereof within the scope of the claims.

We claim:

1. Motorized clutch actuating assembly for controlling the position of a clutch release device and compensating for wear of a clutch, comprising a motorized position operating means with resilient force moderating means therefor, for controlling the operation of the clutch, an actuating mechanism operatively connected between the motorized position operating means and the release device comprising a sector gear freely rotatably mounted about an actuator shaft and meshing with pinion means cooperable with said motorized position operating means, lever means coupled to said actuator shaft and cooperable with said release device for controlling a clutch, detent means mounted on said sector gear cooperable with said lever means in the course of clutch engagement/disengagement for drivingly connecting said motorized position means to said lever means and releasable to permit said lever means to follow the position of said clutch release device when the clutch is engaged to compensate for clutch wear and means for releasing said detent means as a function of the position of said sector gear.

2. A clutch actuating assembly according to claim 1, wherein said lever means comprises a first lever having complementary means cooperable with said detent means, and a second lever fixed for rotation with said actuating shaft, said first and second levers having pivot connections, one of said pivot connections being slotted and the other being a pinned connection and arranged so that said first lever amplifies the angular movement of said second lever.

3. A clutch actuating assembly according to claim 2, wherein said slotted pivot connection is provided between said first and second levers and the pinned connection is provided between said first lever and said sector gear.

4. A clutch actuating assembly according to claim 3, wherein said slotted pivot connecting is oriented substantially radially relative to the actuating shaft axis.

5. A clutch actuating assembly according to claim 1, wherein said detent means comprises a pawl pivotally mounted on said sector gear and cooperable with ratchet teeth on said lever means.

6. A clutch actuating assembly according to claim 5, wherein said pawl is normally biased toward engagement with said ratchet teeth.

7. A clutch actuating assembly according to claim 1, said means for releasing said detent means comprises an abutment cooperable with said detent means for disengaging said detent means from said lever means.

8. A clutch actuating assembly according to claim 1, wherein said detent means comprises a roller retained circumferentially and axially by a cage rotatable about as axis of rotation parallel to said actuating shaft, with means complementary to said detent means defined by bearing surfaces on said sector gear and said lever means.

9. A clutch actuating assembly according to claim 8, wherein said bearing surface on said sector gear defines a wedging ramp and the bearing surface on said lever means is cylindrical and has its axis coaxial with the axis of rotation of said cage.

10. A clutch actuating assembly according to claim 8, wherein said cage is cooperable with a fixed abutment member for freeing said roller from between said bearing surfaces.

11. A clutch actuating assembly according to claim 10, wherein said lever means comprises a first lever and a second lever, said first lever defining the bearing surface on said lever means and cooperable with said roller, and said second lever coupled to said actuating shaft, said lever means having two pivot connections, one of said connections being slotted and the other being pinned and arranged so that said first lever amplifies the angular movement of said second lever.

12. A clutch actuating assembly according to claim 8, wherein said lever means comprises a single lever coupled for rotation with said actuating shaft and cooperable with said roller, and said cage is mounted for rotation about said actuating shaft.

* * * * *